United States Patent Office 3,783,024
Patented Jan. 1, 1974

3,783,024
ELECTRIC CELLS AND BATTERIES
John G. Gibson, Derby, and Ronald Holland, Dorset, England, assignors to British Railways Board, London, England
Filed Nov. 23, 1971, Ser. No. 201,273
Claims priority, application Great Britain, Nov. 24, 1970, 55,835/70
Int. Cl. H01m 35/00
U.S. Cl. 136—6 A     3 Claims

ABSTRACT OF THE DISCLOSURE

An electric cell of the kind which, at its operating temperature, has liquid alkali metal as negative active material (anode), liquid sulphur material as positive active material (cathode), and a solid electrolyte separating anode and cathode compartments. Electrodes of the cell constitute wall portions, for example end plates, of the anode and cathode compartments respectively and are flexible to accommodate changes in volume of the materials in said compartments during discharge of the cell. An electric battery is formed by a plurality of the cells stacked together end to end with the cells electrically in series in which case a single electrode may be disposed between adjacent cells to constitute an end plate for both said adjacent cells.

---

This invention is concerned with electric cells and batteries of the kind which at their normal operating temperature have liquid alkali metal as negative active material (anode) and liquid sulphur material as positive active material (cathode) and a solid electrolyte separating anode and cathode compartments. The liquid alkali metal may comprise a single alkali metal, such as sodium, or a mixture of alkali metals. The positive active material will generally comprise a mixture of sulphur and polysulphides according to the state of the charge of the cell or battery. One form of battery of the kind referred to is known as the sodium-sulphur battery.

The object of this invention is to provide an improved mechanical construction for cells and batteries of the aforesaid kind.

According to this invention the electrodes of an electric cell of the aforesaid kind constitute wall portions of the anode and cathode compartments respectively and are flexible to accommodate changes in volume of the materials in said compartments during discharge of the cell.

In one embodiment of the invention the solid electrolyte comprises an intermediate plate member and the electrodes constitute respective end plates of the cell.

When a plurality of said cells are stacked together end to end with the cells electrically in series, a single electrode may be disposed between adjacent cells to constitute an end plate for both said adjacent cells. Thus said single electrode acts as a bi-polar electrode.

Figure 1:
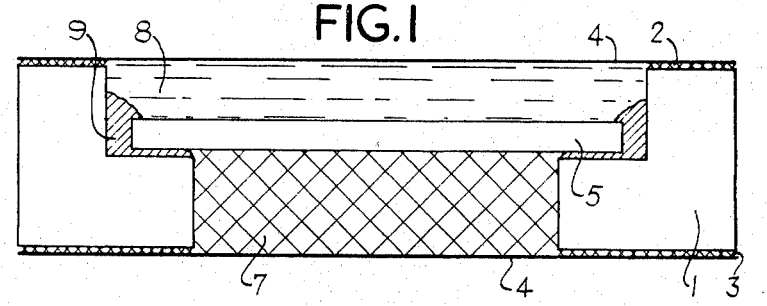
Figure 2:
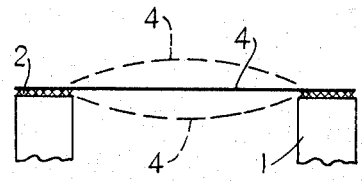
Figure 3:
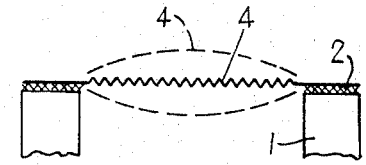
Figure 4:
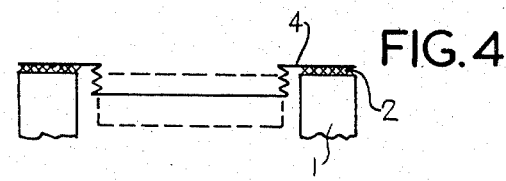
Figure 5:
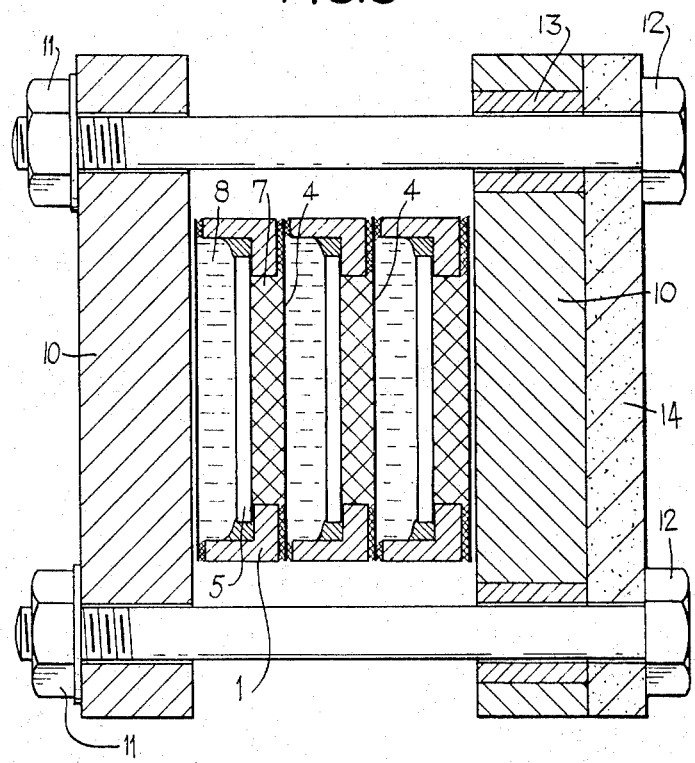

In order that the invention may be readily understood, one cell and battery construction in accordance with the invention will be described by way of example with reference to the accompanying drawings in which:

FIG. 1 illustrates a cross-section through the cell of a sodium sulphur battery, FIG. 2 is an explanatory diagram, FIGS. 3 and 4 show, diagrammatically, modifications of the cell construction, and FIG. 5 illustrates a cross-section of an assembly of cells of the form shown in FIG. 1 to form a sodium sulphur battery.

The cell construction shown in FIG. 1 comprises an annular cell body 1 to the ends of which are sealed by seals 2 and 3, plate electrodes 4 which thus constitutes end plates of the cell. Across the cell body, intermediate its ends, is a membrane 5 constituting the solid electrolyte. Between the electrodes 4 and membrane 5 are defined compartments 7 and 8 constituting the cathode and anode compartments respectively of the cell.

The body 1 essentially acts as a cell wall and should be rigid and impermeable. It may be fabricated from a sintered alumina or any material to which plate 5 constituting the solid electrolyte membrane can be sealed and which is an electronic insulator. The body 1 should preferably be resistant to attack from sodium.

Plate 5 is poly-crystalline material comprising a structural lattice and sodium ions which are mobile with respect to the lattice. Plate 5 is attached to body 1 by means of an impermeable seal 9 which can be a glass (preferably resistant to sodium and sulphur) and which is compatible with plate 5 and holder 1. When holder 5 is fabricated from sintered alumina, Kovar glass has been found to be suitable.

Each plate 4 is an electronically conducting flexible diaphragm which is preferably resistant to the attack of sodium and sulphur. Resistance to attack by sulphur can be accomplished by the use of stainless steel or by coating a metal plate with any of the following:

(i) chromium by plating or chromizing
(ii) a transition metal sulphide, e.g. iron sulphide
(iii) transition metal carbides or nitrides or silicon carbide or nitride.

The plates 4 are sealed to the body 1 by seals 2 and 3 which may be compression seals incorporating a gasket or O ring of compressible material which is preferably not attacked by sodium. For example an aluminum O ring or a graphite gasket (such as Grafoil) may be used. Alternatively, seals 2 and 3 may be hermetic seals which are preferably resistant to sodium metal.

The manner in which plate electrodes 4 flex during charge and discharge of the cell is shown in FIG. 2. To increase the flexibility of the plate 4 it may be corrugated across its whole operative area as shown in FIG. 3 or at end sections as shown in FIG. 4.

If the cell is assembled in the discharged state by filling the compartment 7 initially with sodium polysulphide when it is unnecessary to supply compartment 8 with sodium metal provided that an electronic path exists between plate 5 and plate 4 of compartment 8. Sodium metal is generated in compartment 8 by electrolysis after heating the cell to a temperature greater than the melting point of the sodium poly-sulphide in compartment 7.

In one experimental cell having the construction shown in FIG. 1, the plate 5 was a beta-alumina plate 1.5 mm. thick, the anode compartment 8 was 4.5 mm. deep and 35 mm. in diameter and was filled with about 0.7 gram sodium. The cathode compartment was 2.6 mm. deep and 22 mm. in diameter and was filled with approximately 1.42 grams of sulphur absorbed in carbon felt compressed by a ratio of 2:1. The plates 4 were of stainless steel sheet 0.13 mm. thick.

Referring to FIG. 5, a battery is formed by stacking a plurality of the cells end to end with the cells electrically in series. A single plate electrode 4 is disposed between adjacent cells and thus constitutes a bi-polar electrode serving as an end plate for both cells. A stack of three cells has been shown in FIG. 5, but this could be any desired number.

The stack of cells 1 is clamped between aluminium discs 10 which are drawn towards each other by clamping members in the form of steel nuts and bolts 11 and 12. Two nuts and bolts have been shown in FIG. 1 but three or more nuts and bolts disposed symmetrically about the longitudinal axis of the stack may be used. To break the electrical continuity between the two aluminium discs 10, the bolt orifices in one aluminium disc 10 are lined with alpha-alumina sleeves 13 and an asbestos plate 14 is disposed between the heads of the bolts and the same aluminium disc 10.

The coefficient of thermal expansion of the material from which the bolts 12 are fabricated is similar to and preferably less than the coefficient of expansion of the material of which the cell bodies 1 are made. The dimension of the two aluminium discs 10 is such that their linear expansion exceeds that of the steel bolts at the normal operating temperature of the battery, say 350° C. Thus at the normal operating temperature of the battery the compression force through the stack of cells 1 is maintained or even increased as compared with when the cell is cold.

During discharge of the cells, sodium metal migrates through the electrolyte plate 5 from the anode compartments 8 to the cathode compartments 7. This results in an increase in volume and hydrostatic pressure in the cathode compartments 7 which is compensated for by the flexing of the bi-polar electrodes 4 as shown in dotted line FIG. 2. When a multiplicity of the cells are assembled so as to form the battery then the increase in volume in the cathode compartment and the resultant flexing of the bi-polar electrodes, is compensated for by the attendant loss of material from the adjacent anode compartments 8. The reverse process occurs when the battery is recharged. In practice such an arrangement of cells can be assembled with the bi-polar electrodes 4 initially flat. Then, on charge or discharge, the bi-polar electrodes will tend towards the elastically strained condition.

We claim:
1. An electric cell comprising:
   (a) a hollow annular cell body,
   (b) a solid electrolyte extending as a membrane across said annular cell body intermediate the ends of said annular cell body to divide the cell body into an anode compartment on one side of said membrane and a cathode compartment on the other side of said membrane,
   (c) alkali metal in said anode compartment,
   (d) sulfur material in said cathode compartment and
   (e) electrodes in the form of flexible end plates abutting and sealed to said annular cell body over their peripheral areas to close the ends of said cell body, said end plates being disposed substantially in the same plane as the end of the annular cell body and extending substantially in the end planes of said annular cell body at least over their said peripheral areas, said end plates being constructed and arranged to flex toward and away from the hollow area of said cell body and over their central areas to accommodate volume changes in the anode and cathode compartments.

2. An electric cell according to claim 1 wherein said electrodes are corrugated at least over a part of their said central areas to increase their flexibility.

3. An electric battery comprising a plurality of electric cells stacked together so that they are electrically in series, each cell comprising an annular cell body, a solid electrolyte extending as a membrane across said annular cell body intermediate the ends of said annular cell body to divide the cell body into an anode compartment on one side of said membrane and a cathode compartment on the other side of said membrane, alkali metal in said anode compartment, sulphur material in said cathode compartment, and electrodes in the form of flexible end plates abutting and sealed to said annular cell body over their peripheral areas to close the ends of said cell body, said end plates being disposed substantially in the same plane as the end of the annular cell body and extending substantially in the end planes of said annular cell body at least over their said peripheral areas, whereby said end plates flex over their central areas to accommodate volume changes in the anode and cathode compartments, a single electrode being disposed between each pair of adjacent cells of the stack and so constituting a common end plate for said pair of adjacent cells.

References Cited
UNITED STATES PATENTS

| | | | |
|---|---|---|---|
| 3,514,332 | 5/1970 | Minck | 136—6 |
| 3,463,670 | 8/1969 | Rao et al. | 136—83 R |
| 3,238,437 | 3/1966 | Foster et al. | 136—83 R X |
| 3,475,220 | 10/1969 | Knorr | 136—6 |
| 3,476,602 | 11/1969 | Brown et al. | 136—6 |
| 3,533,848 | 10/1970 | Winn | 136—6 X |

ANTHONY SKAPARS, Primary Examiner

U.S. Cl. X.R.

136—83 R